United States Patent [19]
Watanabe

[11] Patent Number: 5,541,493
[45] Date of Patent: Jul. 30, 1996

[54] METHOD OF CONTROLLING CURRENT FOR COIL OF SYNCHRONOUS MOTOR

[75] Inventor: Masahiro Watanabe, Shizuoka-ken, Japan

[73] Assignee: Toshiba Kikai Kabushiki Kaisha, Tokyo, Japan

[21] Appl. No.: 509,811

[22] Filed: Aug. 1, 1995

Related U.S. Application Data

[63] Continuation of Ser. No. 160,272, Dec. 2, 1993, abandoned.

[30] Foreign Application Priority Data

Dec. 4, 1992 [JP] Japan .................................. 4-325204

[51] Int. Cl.⁶ ........................................................ H02P 5/40
[52] U.S. Cl. ........................ 318/700; 318/710; 318/701
[58] Field of Search .................................. 310/162, 165, 310/210; 318/701, 696, 685, 116, 712, 714–20, 729, 774, 807–809, 493

[56] References Cited

U.S. PATENT DOCUMENTS

| | | | |
|---|---|---|---|
| 3,679,924 | 7/1972 | Menzies | 310/163 |
| 4,520,300 | 5/1985 | Fradella | 318/603 |
| 4,616,165 | 10/1986 | Compter | 318/701 |
| 4,740,738 | 4/1988 | El-Antably et al. | 318/701 |
| 4,743,825 | 5/1988 | Nashiki | 318/723 |
| 4,795,953 | 1/1989 | Compter et al. | 318/696 |
| 4,906,910 | 3/1990 | Tanuma et al. | 318/696 |
| 4,916,370 | 4/1990 | Rowan et al. | 318/757 X |
| 4,992,717 | 2/1991 | Marwin et al. | 318/696 |
| 5,010,267 | 4/1991 | Lipo et al. | 310/162 |
| 5,055,764 | 10/1991 | Rozman et al. | 322/10 |
| 5,168,203 | 12/1992 | Tepavcevic | 318/701 |
| 5,204,604 | 4/1993 | Radun | 318/701 |
| 5,225,758 | 7/1993 | Sahano et al. | 318/701 |
| 5,294,876 | 3/1994 | Jönsson | 318/803 |

FOREIGN PATENT DOCUMENTS

3435303A1 4/1985 Germany .

Primary Examiner—Brian Sirrus
Attorney, Agent, or Firm—Finnegan, Henderson, Farabow, Garrett & Dunner, L.L.P.

[57] ABSTRACT

A method of controlling a synchronous motor comprises the steps of: preparing a rotor of magnetic anisotropy and a stator having a coil used in common for a field coil and an armature coil; and controlling absolute value and phase of coil current supplied to the common coil on the basis of a resultant vector of a current vector for generating a field and an armature current vector. The control method can be realized by a sample control apparatus incorporated in the synchronous motor.

1 Claim, 3 Drawing Sheets

5,541,493

METHOD OF CONTROLLING CURRENT FOR COIL OF SYNCHRONOUS MOTOR

This application is a continuation of application Ser. No. 08/160,272, filed Dec. 2, 1993, now abandoned.

BACKGROUND OF THE INVENTION

The present invention relates to a method of controlling the revolution speed and the torque of a synchronous motor provided with a field generating mechanism including a rotor of magnetic anisotropy, and a control apparatus for controlling the same synchronous motor.

In a conventional synchronous motor incorporated in a machine tool for instance, an armature (stator) and a rotor are provided, and further field poles are formed by arranging permanent magnets on the rotor or by winding coils around the rotor so as to be excited by a dc current. The number of poles is usually from 2 to 8.

Similarly, in a conventional generator, an armature and a stator are provided in the same way as with the case of the synchronous motor, and the field poles are formed by winding coils as electromagnets.

In the conventional synchronous motor or the generator, however, since the permanent magnet or magnets are provided on the rotor or the coil or coils are wound around the rotor, there exist various problems in that the structure is complicated and thereby weakened and further the rotor is deformed or damaged at high speed thereof. In addition, when incorporated in a machine tool in order to drive a main spindle thereof, the conventional motor cannot satisfy the various requirements such as constant output characteristics in a wide speed range, a smooth revolution without torque pulsation, a stable shape free from any thermal deformation due to heat generated by the rotor, etc.

SUMMARY OF THE INVENTION

The object of the present invention is to provide a method of controlling a synchronous motor having no permanent magnets or no coils on the rotor, and an apparatus for controlling the same synchronous motor.

Further, the other object of the present invention is to provide a method of controlling a synchronous motor provided with a field generating mechanism including a rotor of magnetic anisotropy for simplification of the control system configuration, and an apparatus for controlling the same synchronous motor.

To achieve the above-mentioned object, the first aspect of the present invention provides a method of controlling a synchronous motor which comprises the steps of: preparing a rotor of magnetic anisotropy and a stator having a coil used in common for a field coil and an armature coil; and controlling absolute value and phase of coil current supplied to the common coil on the basis of a resultant vector of a current vector for generating a field and an armature current vector.

Further, the second aspect of the present invention provides a control apparatus for a synchronous motor which comprises: a rotor of magnetic anisotropy; a stator having a common coil used in common for a field coil and an armature coil: an angular position sensor for detecting angular positions of said rotor; a phase/current controller for detecting the angular positions of said rotor on the basis of detection signals supplied by said angular position sensor and for determining absolute value and phase of the coil current supplied to the common coil in accordance with a target speed and a target torque of said rotor; and a current control amplifier for controlling the coil current supplied to the common coil on the basis of commands given by said phase/current controller.

In the synchronous motor according to the present invention, since the rotor of magnetic anisotropy is used, it is unnecessary to provide any permanent magnet or coil on the rotor, so that the motor can be constructed simply and further driven at a higher speed.

Further, according to the present invention, since a set of winding is used in common as the field coil and the armature coil and further the absolute value and the phase of the coil current supplied to the common coil is controlled by the resultant current vector, it is possible to simplify the configuration of the control system (or apparatus) and further to provide various advantages of the synchronous motor using a rotor of magnetic anisotropy such that the deterioration of motor characteristics due to the back electromotive force can be improved at high speed, the motor toque characteristics can be improved at low speed, only the stator is formed into a cooling structure, etc.

DETAILED DESCRIPTION OF THE PREFERRED EMBODIMENTS

FIRST EMBODIMENT

The first embodiment of the present invention will be described hereinbelow with reference to FIG. 1, in which a two-pole single-phase synchronous motor is shown by way of example.

Figure 2:
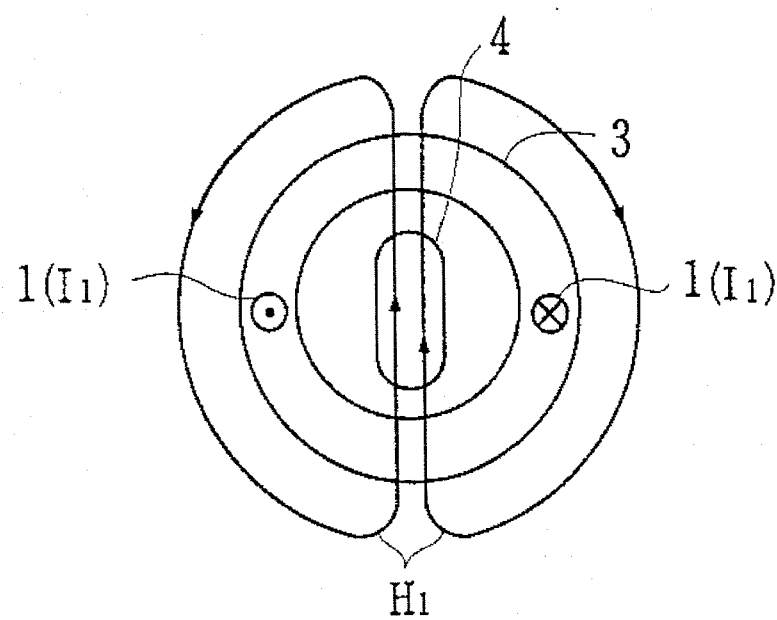
FIG. 2 is a front view showing the rotor and stator of the synchronous motor of the present invention, in which a field generated by a field current is shown.

In FIG. 2, the synchronous motor 8 is composed of a stator 3, a rotor 4, an angular position sensor 5, a phase/current controller 6 and current control amplifiers $7_1$ and $7_2$. A field coil 1 and an armature coil 2 are both wound around the stator 3. The current control amplifier $7_1$ supplies a field current to the field coil 1 and the current control amplifier $7_2$ supplies an armature current to the armature coil 2, in order to rotate the rotor 4 of magnetic anisotropy. The angular position sensor 5 detects angular positions of the rotor 4. The sensor signals of the angular position sensor 5 are given to the phase/current controller 6. On the basis of the sensor signals, the phase/current controller 6 controls the two current control amplifiers $7_1$ and $7_2$, respectively according to the angular positions of the rotor 4, in such a way that the phase of the field current for generating the field can be always maintained at such phase that the rotor 4 can be magnetized effectively at any angular positions of the rotor 4 and additionally the phase of the armature current becomes always perpendicular to the magnetic flux of the field. Accordingly, the revolution speed and the torque of the synchronous motor 8 can be controlled under constant driving conditions continuously, in accordance with the control operation of the current control amplifier $7_1$ for controlling the field coil 1 and the current control amplifier $7_2$ for controlling the armature coil 2.

The principle of generating a torque by the synchronous motor provided with the field generating mechanism including the rotor of magnetic anisotropy will be described in further derail hereinbelow. Further, although the single-phase and two-pole synchronous motor will be explained hereinbelow for simplification, the same principle as described below can be of course applied to other three-phase multi-pole synchronous motor, for instance.

FIG. 2 shows the structure of the synchronous motor 8, in which a field Hi is generated by a field current $I_1$ flowing through the field coil 1 wound around the stator 3.

Figure 3:
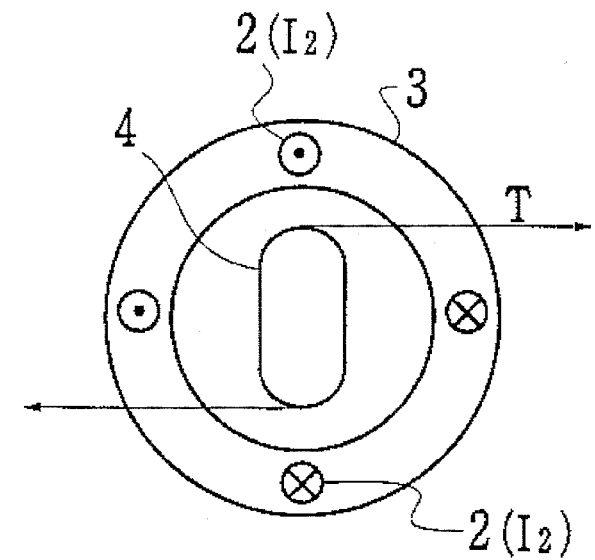
FIG. 3 is a similar front view showing the rotor and stator of the synchronous motor according to the present invention, in which a torque generated by the field and an armature current is shown.

In this stator 3, the phase of the field is controlled under due consideration of the magnetic anisotropy of the rotor 4. In more detail, the field is always applied in the direction along which the rotating rotor 4 can be easily magnetized. Further, as shown in FIG. 3, an armature current $I_2$ is passed through the armature coil 2 wound around the stator 3 so that the rotor 4 can be rotated in cooperation with the field. Accordingly, a motor torque T can be generated by the rotor 4 on the basis of the field $H_1$ and the armature current $I_2$ as expressed below:

$$T=\phi_1 \cdot I_2 \qquad (1)$$

where $\phi_1$ denotes a magnetic flux of the field $H_1$.

Under these conditions, it is possible to allow the rotor 4 to generate a constant torque continuously by controlling the field current $I_1$ and the armature current $I_2$ in such a way that the phase of the field current $I_1$ for generating the field Hi is always kept so that the rotor 4 can be magnetized effectively at any angular positions of the rotor 4 and further the phase of the field current $I_1$ is always kept perpendicular to the magnetic flux $\phi$ of the armature current $I_2$. In order to drive the synchronous motor 8 in accordance with the above-mentioned principle, the motor 8 is controlled by the control apparatus (or system) as shown in FIG. 1.

In the synchronous motor 8 of the present invention, the rotor 4 is formed of a magnetic isotropic substance into a salient pole shape. The rotor 4 formed as described above can be magnetized easily in a predetermined direction, but not magnetized easily in the direction perpendicular to the direction along which the salient pole extends, which is similar to magnetic anisotropic characteristics.

Alternatively, it is also possible to use a magnetic anisotropic substance as the rotor 4. The magnetic anisotropic substance is a grain oriented silicon steel, a grain oriented nickel, etc.

When the rotor 4 or the synchronous motor 8 is formed as described above, since no permanent magnets are provided for the rotor 4, the rotor 4 is simple in structure and can be well balanced, so that It is possible to obtain the rotor 4 which can rotate extremely quietly without being subjected to magnetic vibration. In addition, since no winding is required for the rotor 4, heat will not be generated by the rotor 4.

Further, when the rotor 4 is formed of magnetic anisotropic substance, there exists such an advantage that the rotor 4 can be formed into any shape. Therefore, when the cross-section of the rotor 4 is formed into a circular shape, the rotor 4 can be rotated at high speed.

SECOND EMBODIMENT

Figure 1:
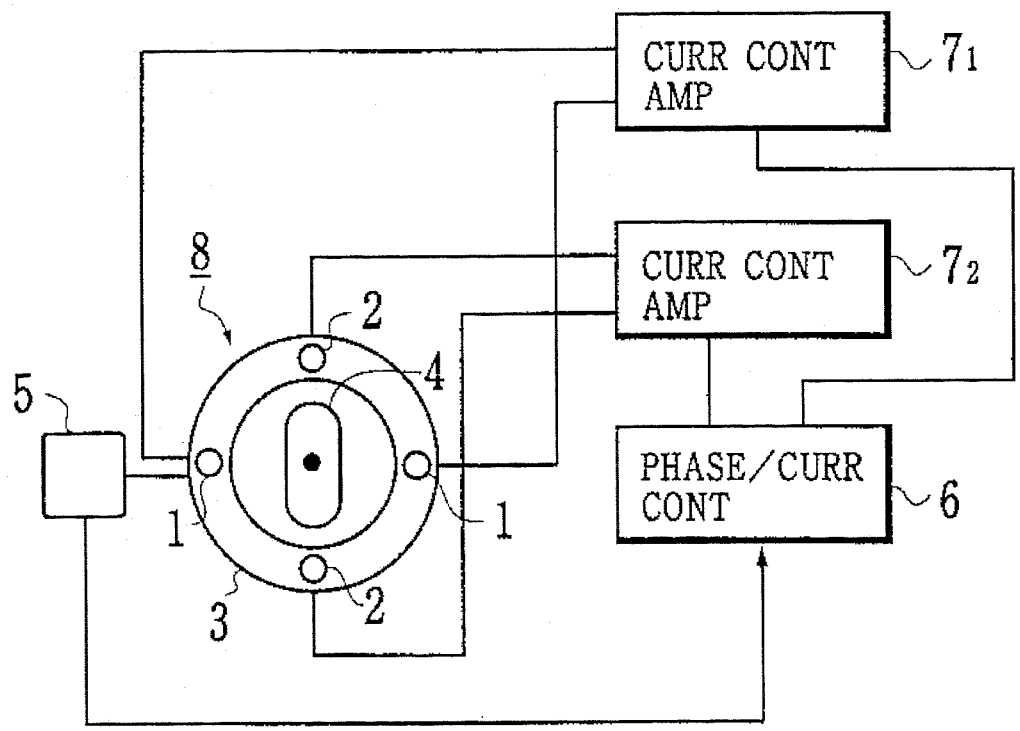
FIG. 1 is a block diagram showing a first embodiment of the control apparatus of the synchronous motor according to the present invention.
Figure 4:
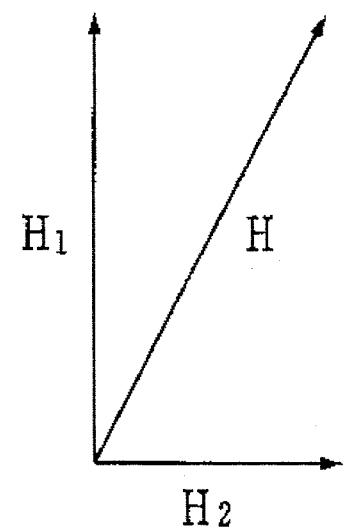
FIG. 4 is a vectorial diagram showing a resultant vector of the field vector and the armature field vector.

In the first embodiment shown in FIG. 1, the field coil 1 and the armature coil 2 are provided independently to generate two different magnetic fields. However, the magnetic field applied to the rotor to generate a torque is an addition of vectors of these two magnetic fields, as shown in FIG. 4 and expressed as follows:

$$H=H_1+H_2 \qquad (2)$$

where H denotes a resultant magnetic field, $H_1$ denotes a magnetic field generated by the field coil and $H_2$ denotes a magnetic field by the armature coil.

In this second embodiment, therefore, a resultant magnetic field obtained by the two separate coils is generated by a single coil. Further, the absolute value and the phase of coil current passed through the single coil is controlled on the basis of the resultant current vector of a current vector for generating the field and a current vector for the armature.

Figure 5:
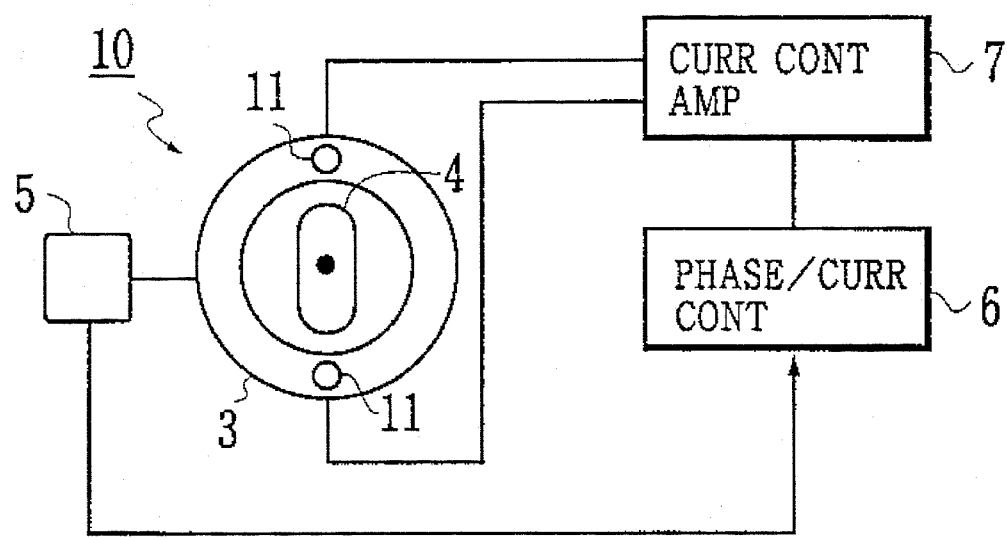
FIG. 5 is a block diagram showing a second embodiment of the control apparatus according to the present invention.

FIG. 5 shows a control apparatus of the synchronous motor of the second embodiment according to the present invention.

The synchronous motor 10 comprises a rotor 4 of magnetic anisotropy, and a stator 3 provided with a common coil 11 having a plurality of poles. The number of the poles corresponds to the number of phases of the alternating current applied to the motor 10. In other words, the common coil 11 provided for the stator 3 is used as the field coil and the armature coil in common. Further, the control apparatus of the synchronous motor 10 is composed of an angular position sensor 5, a phase/current controller 6 and a current control amplifier 7, in order to control the absolute value and the phase of the current supplied to the common coil 11.

In the same way as with the case of the first embodiment shown in FIG. 1, in order to generate a constant torque continuously, the motor 10 is controlled by the current passed through the common coil 11 in such a way that the phase of the current I for generating the field H is always kept so that the rotor 4 can be magnetized effectively at any angular positions of the rotor 4 and further the phase of the current I is always kept perpendicular to the flux $\phi$ generated by the filed H.

In more detail, the current control amplifier 7 controls the current value passed through the common coil 11 on the basis of pulse width modulation technique in the same way as with the case of the conventional synchronous AC servomotor. Here, in the case of the first embodiment, since the field coil and the armature coil are both provided separately, two current control amplifiers 7 are required. In this second embodiment, however, since only the single common coil 11 is provided, only one current control amplifier 7 is used.

In operation, in response to the sensor signals of the angular position sensor 5, the phase/current controller 6 detects the angular positions of the rotor 4, calculates the absolute value and the phase of the resultant field relative to the angular positions of the rotor 4 in accordance with speed and torque commands required for the synchronous motor 10, and applies the calculated absolute value and phase commands to the current control amplifier 7.

On the basis of the command signals supplied by the phase/current controller 6, the current control amplifier 7 controls the resultant current vector of the filed current vector and the armature current vector, that is, the absolute value and the phase of the current supplied to the common coil 11.

In more detail on the basis of some expressions, here when the angular position (rotational angle) of the rotor 4 detected by the angular position sensor 5 is denoted by $\theta_0$, the phase of the current vector for generating the field is expressed as $(\theta_0 + \pi/2)$, and the phase of the current vector of the armature is expressed by $\theta_0$. Therefore, the magnetic flux $\phi$ generated by the common coil 11 at the rotor 4 can be expressed as $$\phi = K_\phi \cdot |I_1| \quad (3)$$

where $K_{100}$ denotes a constant value of the magnetic flux generated by the common coil 11 at the rotor 4 per unit current, which is determined on the basis of the physical system of the motor, and $|I_1|$ denotes the absolute value of the component (for generating the field) of the resultant current vector.

Under these conditions, when the absolute value of the component (for generating the armature) of the resultant current vector is denoted by $|I_2|$, the generated torque T can be expressed as $$T = \phi \cdot |I_2| \quad (4)$$

Therefore, $$T = K_{100} \cdot |I_1| \cdot |I_2| \quad (5)$$

Further, since the angle between two current vectors $I_1$ and $I_2$ is determined to be $\pi/2$, the absolute value $|I|$ of the resultant vector can be expressed as $$|I| = (|I_1|^2 + |I_2|^2)^{1/2} \quad (6)$$

Here, the phase of the vector can be given by $$\theta = \theta_{518} + \arctan(|I_2|/|I_1|) \quad (7)$$

Further, any given values of $|I_1|$, $|I_2|$ which satisfy the above expression (5) can be determined theoretically, as far as the value is less than the rated current value.

As described above, under the torque condition that the expression (5) is satisfied, the absolute value and the phase of the current supplied to the common coil 11 are controlled in accordance with the expressions (6) and (7). Accordingly, in the same way of controlling two currents supplied to the two coins independently, It is possible to control the revolution speed and the torque of the synchronous motor provided with the field generating mechanism which uses the rotor of magnetic anisotropy.

A preferred example of applying the control method for the synchronous motor according to the present invention will be described hereinbelow.

In the case of a machine tool, the main spindle is required to be driven so as to output a high torque at a low speed but a low torque at a high speed, that is, under power-constant control condition. The power-constant control as described above can be easily realized by the control method of the present invention as follows:

(a) High torque at low speed

Figure 6:
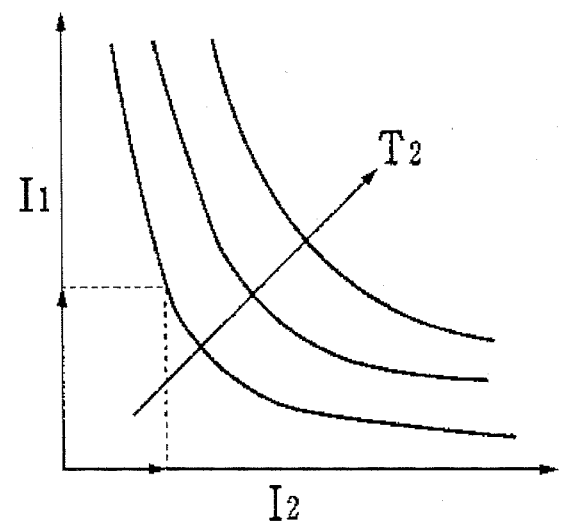
FIG. 6 is a graphical representation showing the characteristic curves obtained by the field current and the armature current to generate a target torque in the second embodiment.

As expressed by the expression (5), the torque T can be determined by the resultant vector (combination) of the field current $I_1$ and the armature current $I_2$ along the hyperbolic characteristic curves as shown in FIG. 6 (in which the negative side is omitted). Therefore, it is possible to obtain a constant torque, as far as the combination of the two currents is determined on these characteristic curves. For instance, when a high torque is required at a low speed, the field current $I_1$ and the armature current $I_2$ are both increased respectively to shift the hyperbolic curves obliquely upward in the arrow direction in FIG. 6. In this case, it is possible to drive the synchronous motor most effectively by the minimum possible energy to obtain a predetermined torque, by controlling the phase difference between the resultant current vector and the field current (magnetic flux) vector or the armature current vector so as to be $\pi/4$.

(b) Low torque at high speed

When the revolution speed of the motor increases, since a back electromotive force is generated by the field, the torque is usually decreased so that the revolution speed also decreases. In this case, it is possible to increase the motor speed, while keeping the torque at a constant value, by decreasing the intensity of the field current but increasing the intensity of the armature current. This is because the back electromotive force can be reduced when the field current becomes small.

Further, it is possible to design the control apparatus in such a way that the above-mentioned two control modes can be switched easily from each other by use of control software.

What is claimed is:

1. A method of controlling a synchronous motor including a rotor of magnetic anisotropy and a stator having a common coil for use as a field coil and an armature coil, the method comprising:

supplying current to the common coil to generate a composite vector including a field current vector and an armature current vector, controlling phase difference between the composite vector and the field current vector or the armature current vector to maintain the phase difference at $\pi/4$ (45°) to operate the motor with minimum energy, and controlling the magnitude of the supplied current by decreasing the magnitude of the field current while increasing the magnitude of the armature current to operate the motor with reduced back electromagnetic force.

* * * * *